(12) United States Patent
Chen

(10) Patent No.: US 9,169,887 B2
(45) Date of Patent: Oct. 27, 2015

(54) BRAKE DISK

(71) Applicant: Hui-Chuan Chen, Taichung (TW)

(72) Inventor: Hui-Chuan Chen, Taichung (TW)

( * ) Notice: Subject to any disclaimer, the term of this patent is extended or adjusted under 35 U.S.C. 154(b) by 0 days.

(21) Appl. No.: 14/219,590

(22) Filed: Mar. 19, 2014

(65) Prior Publication Data
US 2015/0267764 A1    Sep. 24, 2015

(51) Int. Cl.
*F16D 65/12*    (2006.01)
*F16D 65/02*    (2006.01)

(52) U.S. Cl.
CPC ...... *F16D 65/128* (2013.01); *F16D 2065/1328* (2013.01)

(58) Field of Classification Search
CPC .......... F16D 65/128; F16D 2065/1328; F16D 2065/48; F16D 2065/487; F16D 13/72
See application file for complete search history.

(56) References Cited

U.S. PATENT DOCUMENTS

| 6,161,661 A | * | 12/2000 | Pahle et al. | ............. | 188/218 XL |
| 2008/0289918 A1 | * | 11/2008 | Boike et al. | ............. | 188/218 XL |

FOREIGN PATENT DOCUMENTS

| DE | 1625827 A1 | * | 8/1970 |
| DE | 2257176 A1 | * | 5/1974 |
| DE | 2507264 A1 | * | 2/1975 |
| DE | 2507264 A1 | * | 9/1976 |
| DE | 10129500 A1 | * | 11/2002 |
| DE | 102004056645 A1 | * | 6/2006 |
| DE | 102009008428 A1 | * | 8/2010 |
| EP | 0521754 A1 | * | 1/1993 |

* cited by examiner

*Primary Examiner* — Anna Momper

(57) ABSTRACT

A brake disk includes an annular body, a plurality of first heat dissipation holes and a plurality of second heat dissipation holes. The annular body has two opposite side surfaces, an inner circumferential wall and an outer circumferential wall. The first heat dissipation holes are formed on at least one of the two side surfaces. The second heat dissipation holes penetrate through the annular body between the inner circumferential wall and the outer circumferential wall. A surface within any of the second heat dissipation holes is formed with irregular structures.

12 Claims, 4 Drawing Sheets

BRAKE DISK

BACKGROUND OF THE INVENTION

1. Field of the Invention

The present invention relates to a brake disk, and more particularly to a brake disk with good heat dissipation efficiency.

2. Description of the Prior Art

It is ordinary to use a car for traveling and the car usually equips with a disk brake device for a brake system. A brake disk of the disk brake device is fixed on a wheel of the car, and a caliper of the disk brake device clamps the two side surfaces of the brake disk to induce friction and makes the brake disk and the wheel stop while braking. Moreover, heat is induced when the caliper rubs against the brake disk, and thus the disk brake device works in low efficiency and the life of usage shortens. Thus, a plurality of heat dissipation holes are formed on the brake disk to increase the surface area of the brake disk and to make the heat dissipation performance better. This kind of brake disk is disclosed in TWM382275, TWM263432 and so on.

However, the heat dissipation holes are only formed in axial direction on the brake disk in conventional techniques. The forwarding direction of the brake disk is perpendicular to the direction of the heat dissipation holes, so there is inefficient air convection acting upon the heat dissipation holes. The performance of the brake system is bad because of bad heat dissipation performance, and this disadvantage is needed to be improved.

The present invention has arisen to mitigate and/or obviate the afore-described disadvantages.

SUMMARY OF THE INVENTION

The primary object of the present invention is to provide a brake disk, the brake disk comprises a plurality of heat dissipation holes penetrating through the brake disk. By using a design of the heat dissipation holes penetrating through the brake disk, the surface area of the brake disk contacting with air is increased, and thus the heat dissipation performance of the brake disk and the brake system performance are improved.

To achieve the above object, a brake disk in accordance with present invention comprises an annular body, a plurality of first heat dissipation holes and a plurality of second heat dissipation holes. The annular body is integrally formed in one piece, and has two opposite side surfaces, an inner circumferential wall and an outer circumferential wall. A surface within any of the second heat dissipation holes is formed with irregular structures.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
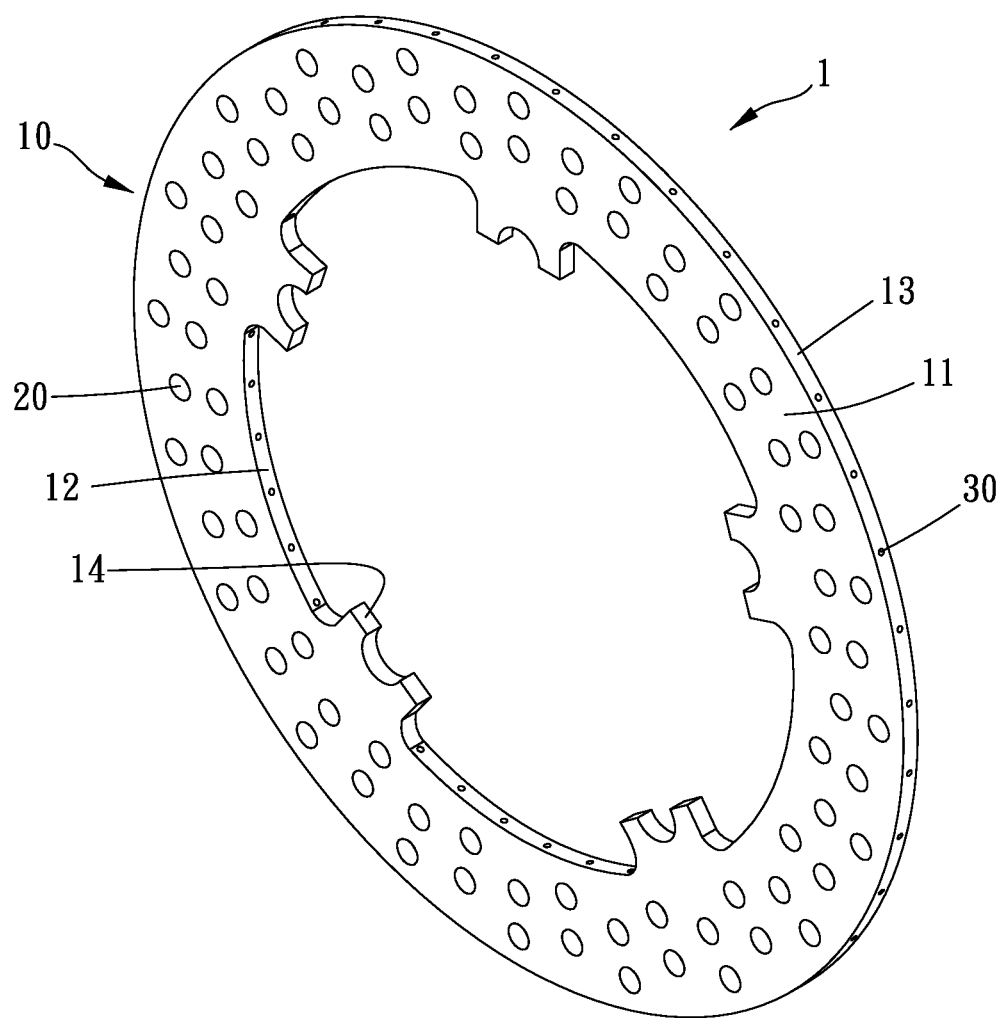
FIG. 1 is a three-dimensional view of a brake disk in accordance with a first embodiment of the present invention.
Figures 2, 3:
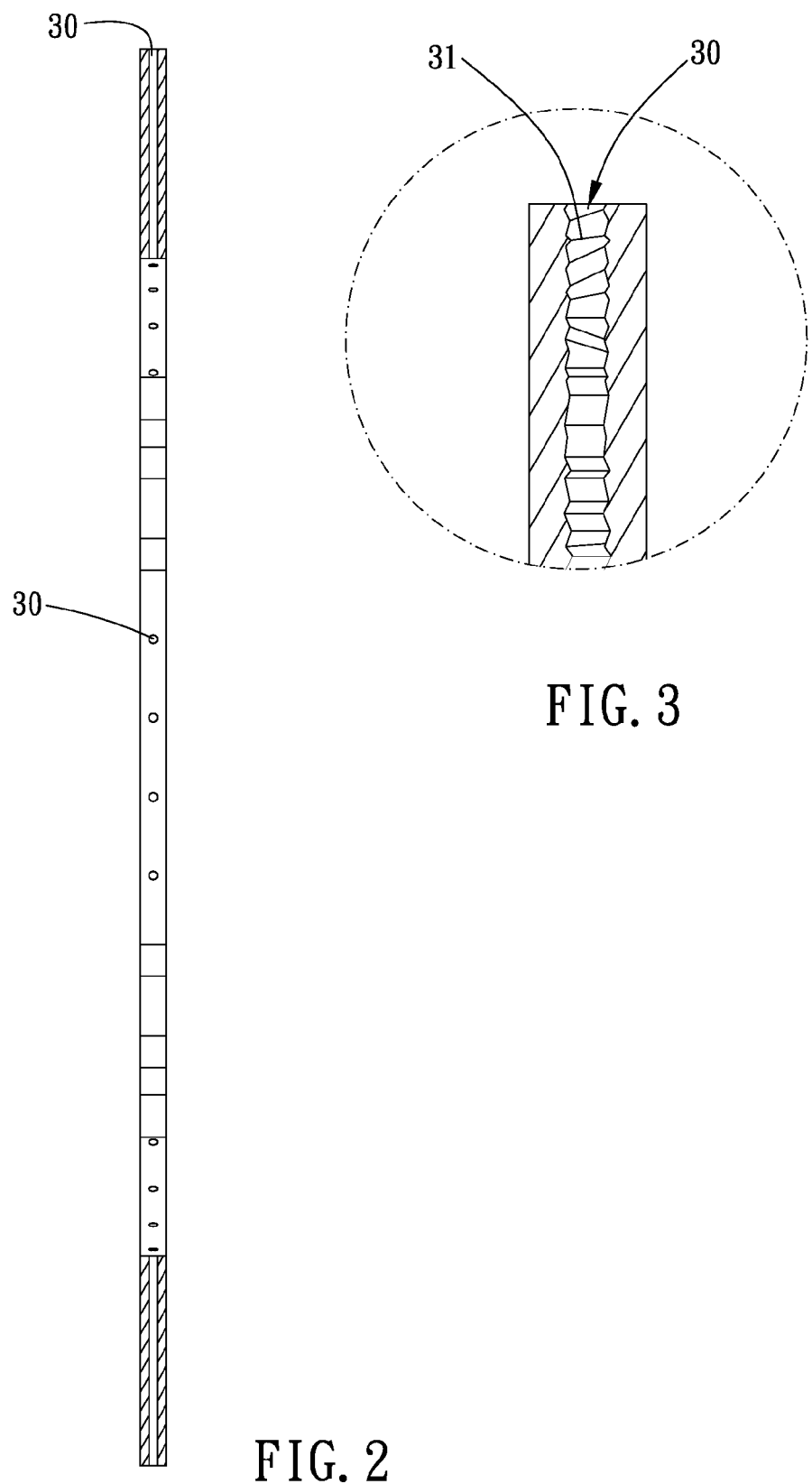
FIG. 2 is a cross-sectional view of the brake disk in accordance with the first embodiment of the present invention.
FIG. 3 is a partial cross-sectional view of the brake disk in accordance with the first embodiment of the present invention.

Referring to FIGS. 1-3, a brake disk in accordance with a preferred embodiment of the present invention comprises an annular body 10, a plurality of first heat dissipation holes 20 and a plurality of second heat dissipation holes 30.

The annular body 10 is integrally formed in one piece, and comprises two opposite side surfaces 11, an inner circumferential wall 12 and an outer circumferential wall 13. The inner circumferential wall 12 is formed with a plurality of fixation portions 14 extending toward the interior of the annular body 10. The fixation portions 14 are for connection with a corresponding inner disk body (not shown). The number of the fixation portions 14 is 5 in this embodiment; however, the number of the fixation portions 14 may be others in other embodiments.

The first heat dissipation holes 20 are formed on at least one of the two side surfaces 11 and for increasing the surface area of the annular body 10 to improve the heat dissipation performance of the annular body 10. Preferably, at least part of the first dissipation holes 20 penetrates through between the two side surfaces 11. Specifically, the first heat dissipation holes 20 are axially formed and distributed on the two side surfaces 11, and the first heat dissipation holes 20 may be through holes penetrating through the annular body 10 or blind holes.

The second heat dissipation holes 30 penetrate through between the inner circumferential wall 12 and the outer circumferential wall 13, and a surface within any of the second heat dissipation holes 30 is formed with irregular structures 31. The irregular structures 31 are formed as thread-shaped or concave-convex-shaped. The irregular structures 31 may be formed as a different structure type via a different forming method to meet a demand. The dimension of any of the second heat dissipation holes 30 is equal to or smaller than two-fifth of the thickness between the two opposite side surfaces 11, so that the annular body 10 still has a strong structural strength.

Each of the second dissipation holes 30 is uncommunicated with any of the first heat dissipation holes 20 and the second heat dissipation holes 30 are disposed between part of the first heat dissipation holes 20. Specifically, as a vehicle (not shown) equipped with the brake disk 1 moves forward, the outer periphery of the annular body 10 is close-hauled, and air can flow into the annular body 10 through the second heat dissipation holes 30 to lower the temperature of the brake disk 1, and the heat dissipation performance of the brake disk 1 is improved.

Figure 4:
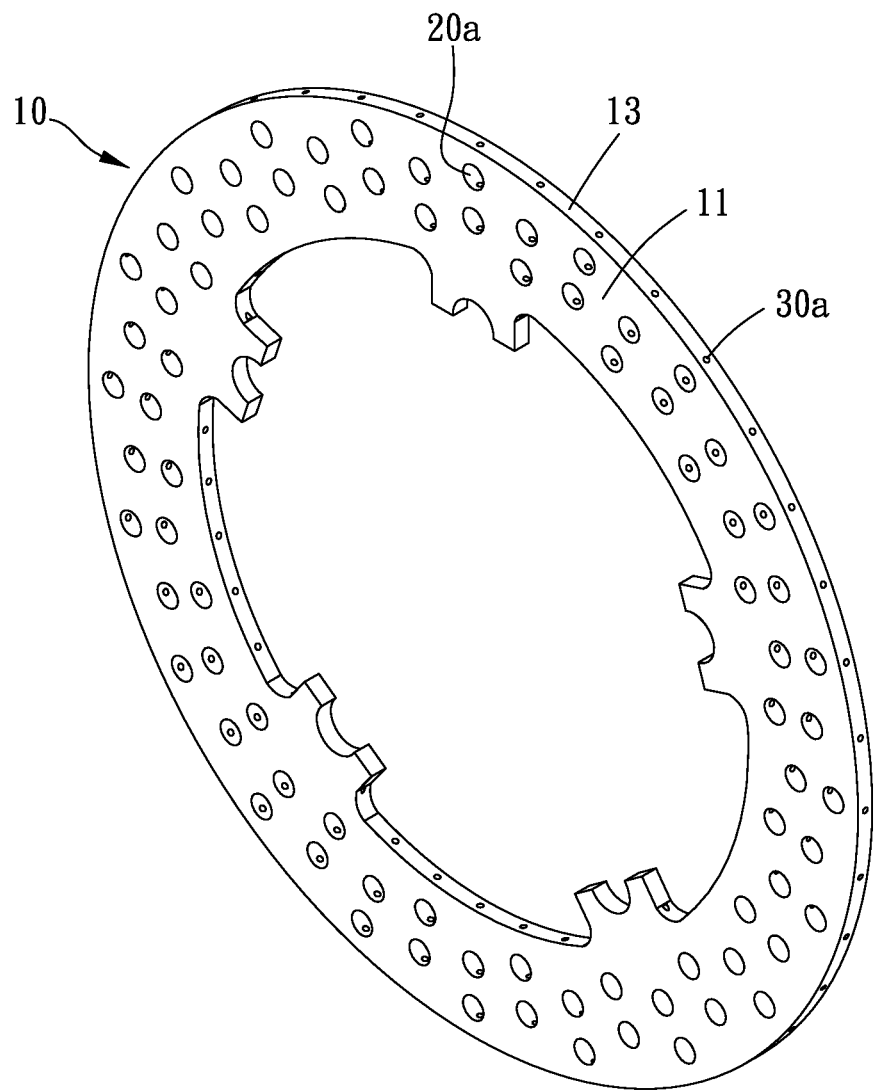
FIG. 4 is a three-dimensional view of a brake disk in accordance with a second embodiment of the present invention.
Figure 5:
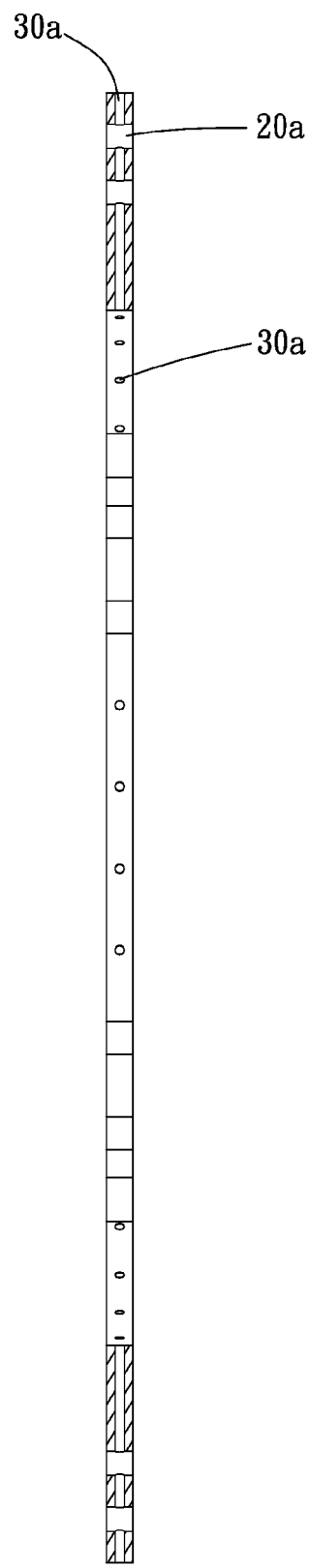
FIG. 5 is a cross-sectional view of the brake disk in accordance with the second embodiment of the present invention.

A second embodiment is shown in FIGS. 4-5. Compared with the first embodiment, at least part of second heat dissipation holes 30a communicates with part of first heat dissipation holes 20a in the second embodiment. In addition, as the vehicle equipped with the brake disk 1 moves forward, the outer periphery of the brake disk 1 is close-hauled, the air can flow into the annular body 10 and part of the first heat dissipation holes 20a through the second heat dissipation holes 30a. This structure makes the air flow into the annular body 10 with higher efficiency, and thus the temperature of the brake disk 1 is lowered effectively. So the heat dissipation performance of the brake disk 1 is highly improved.

As a conclusion, the brake disk comprises a plurality of the second heat dissipation holes, and the convection of the air flow is improved by the design of the second dissipation holes. As a result, the heat dissipation performance of the brake disk and the brake system performance are improved.

While we have shown and described various embodiments in accordance with the present invention, it should be clear to those skilled in the art that further embodiments may be made without departing from the scope of the present invention.

What is claimed is:

1. A brake disk, comprising:
    an annular body, integrally formed in one piece, having two opposite side surfaces, an inner circumferential wall and an outer circumferential wall;
    a plurality of first heat dissipation holes, formed on at least one of the side surfaces; and
    a plurality of second heat dissipation holes, penetrating through between the inner circumferential wall and the outer circumferential wall, a surface within any of the second heat dissipation holes being formed with irregular structures;
    wherein each diameter of each second heat dissipation hole is smaller than ½ of each diameter of each first heat dissipation hole.

2. The brake disk as claimed in claim 1, wherein at least part of the first heat dissipation holes penetrates through the annular body between the two side surfaces.

3. The brake disk as claimed in claim 1, wherein at least part of the second heat dissipation holes communicates with part of the first heat dissipation holes.

4. The brake disk as claimed in claim 1, wherein each of the second heat dissipation holes is uncommunicated with any of the first heat dissipation holes.

5. The brake disk as claimed in claim 1, wherein the irregular structures are formed as thread-shaped.

6. The brake disk as claimed in claim 1, wherein the irregular structures are formed as concave-convex-shaped.

7. The brake disk as claimed in claim 1, wherein the dimension of any of the second heat dissipation holes is equal to or smaller than two-fifth of the thickness between the two opposite side surfaces.

8. The brake disk as claimed in claim 1, wherein each diameter of each first heat dissipation hole is greater than the thickness between the two opposite side surfaces.

9. The brake disk as claimed in claim 1, wherein a ratio of the thickness between the two opposite side surfaces to a diameter of the annular body is between (1:165) and (3:80).

10. The brake disk as claimed in claim 1, wherein each second heat dissipation hole is merely individually open on the inner circumferential wall without being open on the two opposite side surfaces, and each second heat dissipation hole has a closed opening contour on the inner circumferential wall.

11. The brake disk as claimed in claim 1, wherein the inner circumferential wall is formed with a plurality of fixation portions extending toward an interior of the annular body and for connection with a corresponding inner disk body, and each free end of each fixation portion toward the interior of the annular body is concavely recessed.

12. The brake disk as claimed in claim 3, wherein the inner circumferential wall is formed with a plurality of fixation portions extending toward an interior of the annular body and for connection with a corresponding inner disk body, each free end of each fixation portion toward the interior of the annular body is concavely recessed, and a part of the at least part of the second heat dissipation holes communicating with the part of the first heat dissipation holes is open at one said fixation portion.

\* \* \* \* \*